July 24, 1962  N. C. UECKER  3,045,356
ROLL-YAW PRESENTATION DEVICE
Filed Dec. 24, 1958
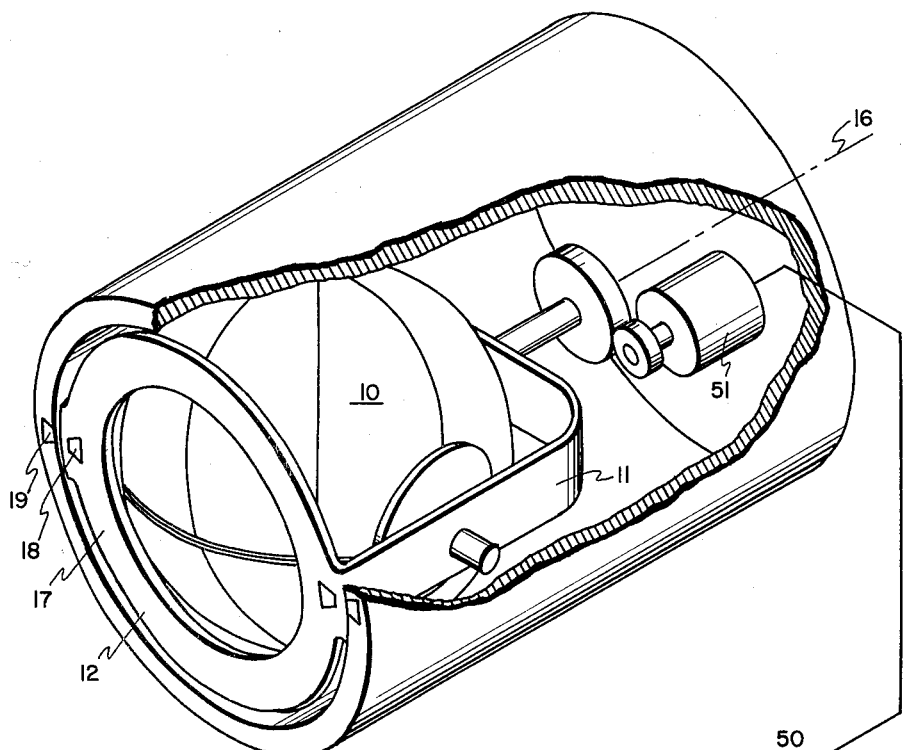
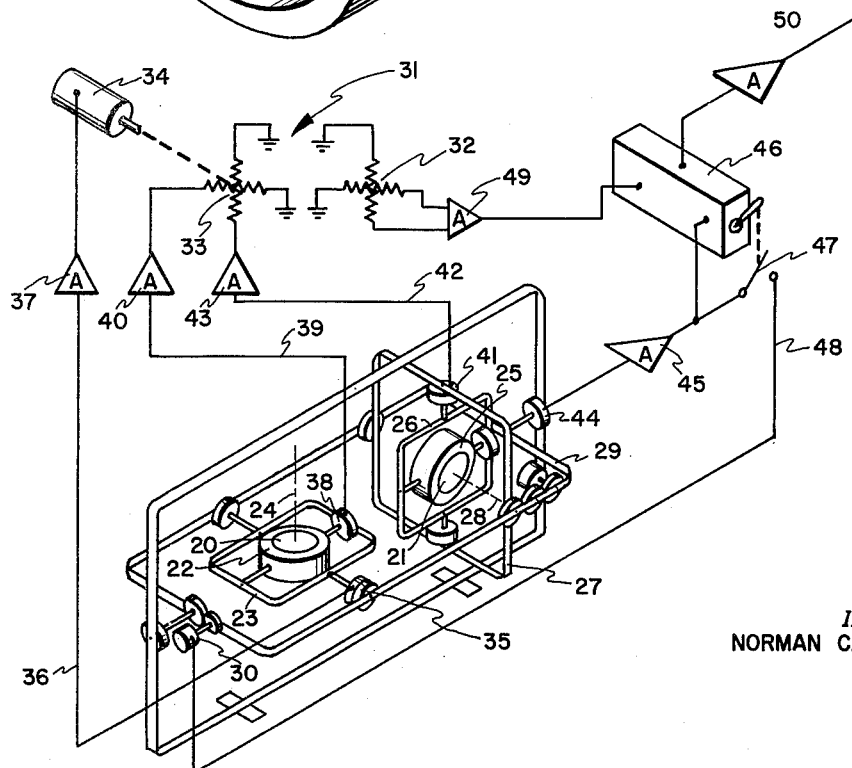
*INVENTOR.*
NORMAN C. UECKER United States Patent Office 3,045,356
Patented July 24, 1962

3,045,356
ROLL-YAW PRESENTATION DEVICE
Norman C. Uecker, Grand Rapids, Mich., assignor to Lear, Incorporated
Filed Dec. 24, 1958, Ser. No. 782,777
5 Claims. (Cl. 33—204)

This invention relates to a device for presenting roll information and roll-yaw information of an aircraft to the pilot and is a continuation in part of the co-pending application by the same inventor entitled, "Roll-Yaw Presentation Device," Serial No. 687,648, filed October 2, 1957, and assigned to the assignee of this application.

The present invention will be described in connection with two different maneuvers of an aircraft during flight for purposes of best illustrating the value of the invention to the pilot of the aircraft. The first of these maneuvers is ordinary flying of the aircraft in level flight or in a straight line parallel with the surface of the earth. It is well known that the aircraft tends to deviate from straight line flight because of various wind currents and air conditions which will effect the attitude of the aircraft relative to the surface of the earth unless the attitude is continuously corrected. In level flight, the aircraft may be kept on course by rolling and/or yawing the aircraft.

For example, when the aircraft starts to move sideways, it can either be rolled or yawed back to the desired straight line flight path and thus maintained at a constant elevation and level or parallel to the earth. In this maneuver, the roll axis is maintained parallel to the surface of the earth and rolling of the aircraft about its roll axis is presented to the pilot by means of a roll indicator controlled by and responsive to a gyro mechanism. It is well known that when the aircraft is rolled, its pitch axis does not remain parallel with the surface of the earth and that the wings are not maintained level.

When the aircraft is yawed to keep it in its straight line flight path, or one parallel thereto, and level with the earth, the aircraft is turned about its yaw axis. In these instances, it is possible to return the aircraft to its straight line flight path while keeping the roll axis of the aircraft and the pitch axis of the aircraft level and parallel with the surface of the earth. The attitude of the aircraft relative to the earth during yaw also may be presented to the pilot on an indicator which responds to and is controlled by the gyro mechanism carried in the aircraft.

The second maneuver, heretofore mentioned, is a wings level maneuver wherein the pitch axis of the aircraft is maintained level and parallel to the surface of the earth during climb, dive and level flight. It is recognized that during climb or dive attitudes, the azimuth axis of the aircraft is not vertical to the surface of the earth and the roll axis of the aircraft is not parallel to the surface of the earth. As the aircraft goes into a steeper or more vertical climb or dive attitude, the angle between the aircraft roll axis and the surface of the earth increases. Roll indications on the indicator become false and ambiguous as vertical flight is approached.

Perfection of the wings level or second maneuver is attained when the roll axis of the aircraft remains in one vertical plane relative to the surface of the earth during climb or dive part of the maneuver. In order to keep the aircraft flying in this vertical plane, it is necessary to keep the wings level and thus keep the pitch axis of the aircraft parallel with the surface of the earth and perpendicular to that vertical plane. If the pitch axis of the aircraft is not maintained parallel to the surface of the earth, the aircraft will veer out of the vertical plane to the right or left.

As was previously mentioned, during high climb or dive attitudes, information presented as roll information on the indicator is false. Because of this, corrections must be made in the information presented to the pilot so that he can manipulate the controls of the aircraft to maintain its pitch axis parallel with the surface of the earth. It has been found that such information can be obtained from the gyro mechanism and presented by means of the roll indicator. In this way during the first maneuver, the pilot is presented true roll information of the aircraft and during the second maneuver, is presented information showing the true relation of the pitch axis of the aircraft relative to the surface of the earth on a common and single indicator which responds to and is controlled by a gyro mechanism.

In view of the foregoing, it is apparent that one of the objects of the present invention is to present information to the pilot to enable him to fly the aircraft in either of the heretofore mentioned maneuvers or modes of operation, the information for both maneuvers being presented on a common indicator.

A further object of the invention is to provide a combination of an indicator and a gyro mechanism for controlling that indicator with a switch device operable by the pilot and interassociated with the indicator and gyro mechanism in such way that when the switch device is in one position, only roll information is presented to the pilot and when the switch device is in another position, a combination of roll and yaw information is presented to the pilot to enable him to maintain the pitch axis of the aircraft level and parallel with the surface of the earth.

Other objects and a fuller understanding of the invention will become apparent from the following description of a preferred embodiment of the invention when taken in conjunction with the attached drawing which illustrates, partly in plan view and partly in cross-section, the construction of the invention.

Referring to the drawings, the invention includes an indicator and its associated gyro mechanism. In this indicator there is provided a sphere 10 mounted within a gimbal 11 and a roll ring 12. The roll ring 12 is secured to the roll gimbal 11 in front of sphere 10 in such manner that the ring 12 encircles the sphere or element 10.

The roll ring 12 is mounted in front of the element or sphere 10 and annularly about the roll axis 16 thereof so that the pilot may see the element 10 through the roll ring 12. The roll ring has a front surface 17 provided with spaced indices or marks 18 and the indicator has an aircraft fixed roll index 19 cooperative with these indices 18 to present the amount of roll during level flight to the pilot.

The gyro mechanism illustrated in the drawings for the purpose of better explaining the invention includes a roll stabilized vertical gyro 20 and a roll and pitch stabilized directional gyro 21.

The vertical gyro 20 has a gyro rotor, an inner gimbal 22, the axis of which is parallel to the aircraft's roll axis, and an outer gimbal 23 the axis of which is parallel to the aircraft's pitch axis. The gyro rotor spin axis 24 is maintained at true vertical by suitable, well known erection systems which constantly torque the inner roll and pitch gimbals to gravity vertical.

The directional gyro 21 has a gyro rotor, an inner gimbal 25, the axis of which is maintained horizontal, a second gimbal 26, the axis of which is maintained vertical by a pitch follow-up gimbal 27, the axis of which is parallel to the aircraft's pitch axis. A suitable leveling system, holding the inner gimbal 21 at a zero displacement condition and the pitch follow-up gimbal holding the azimuth gimbal 26 vertical, both act to maintain the directional gyro 21 rotor spin axis 28 horizontal.

The vertical gyro's outer gimbal 23 and the directional gyro's outer gimbal 27 are suspended from the common outer roll gimbal 29. The outer roll gimbal 29 is servoed normally by the torque motor 30 to maintain the inner gimbal 22 parallel with the outer gimbal 23 whereby the gyro spin axis 24 is perpendicular to the pitch axis through any and all maneuvers to which the gyro may be subjected.

A resolver 31 has a stator 32 and a rotor 33. A motor 34 drives the rotor 33. A pitch axis synchro 35 emits signals along line 36 to drive the motor 34 by way of amplifier 37. An inner roll synchro 38 transmits signals along line 39 by way of amplifier 40 to one of the rotor windings. The yaw synchro 41 transmits signals along line 42 to amplifier 43 and on to the second winding of rotor 33. An outer roll synchro 44 transmits signals by way of amplifier 45 to switch box 46 and switch 47. The other end of switch 47 is electrically connected by line 48 to the motor 30. The stator 32 of resolver 31 is connected by way of amplifier 49 to the switch box 46. The output of switch box 46 is fed through a servo amplifier 50. A motor 51 is connected and responsive to the output of amplifier 50. The motor 51 drives the sphere 10 about the roll axis 16. The switch box 46 allows two modes of operation—one whereby the motor 51 is driven by signals from the outer roll synchro 44, in which case the switch 47 is open. In this case the switch box 46 does not allow signals from the amplifier 49 to pass to the motor 51. In the second mode of operation, the switch 47 is closed thereby allowing any signal emitted by the outer roll synchro 44 to be transmitted directly to the torque motor 30. This in effect locks the roll gimbal 29 to the air frame. Now the motor 51 is driven by a combination of signals from the inner roll pickoff 38 and yaw pickoff 41 by way of resolver 31. The rotor 33 of resolver 31 is driven by the motor 34 in response to signals emitted by the pitch synchro 35.

With the gimbal locked and the aircraft in level flight, the azimuth synchro 41 is a valid source of aircraft yaw information and the inner roll synchro 38 is a valid source of aircraft roll information. Now, with the gimbal still locked and the aircraft in vertical flight, the azimuth synchro 41 is a valid source of aircraft roll information and the inner roll synchro 38 is a valid source of aircraft yaw information. Note that roll and yaw data development switched from the inner roll to the azimuth synchro and yaw data development switch from the azimuth to the inner roll synchro as pitch progressed from zero degrees to 90 degrees. As pitch progresses from zero degrees to 90 degrees, a mixture of roll and yaw information is obtained from both gyro synchros 38 and 41. Further, resolution to obtain pure yaw and pure roll information is accomplished in resolver 31 with the rotor 33 being turned as a function of the pitch information coming from the pitch synchro 35. This information is then presented to the pilot by movement of sphere 10 if the switch 46 is in the proper position.

It is to be noted that, in the illustration, the selection of one of the modes is accomplished by a manual switch. However, an automatic switch may be substituted for the manual switch which will change to the second mode of operation whenever the pitch synchro indicates the aircraft has deviated a predetermined amount from level flight.

It is thus apparent that the present invention provides structure for presenting information to the pilot in such manner that the pilot can fly the aircraft either in ordinary flight or the first described maneuver on information based on only roll attitude of the aircraft or in the wings level or second manuver on information based on a combination of roll and yaw attitude of the aircraft.

Although the present invention has been described with a certain degree of particularity, it is understood that various modifications in the details, description and arrangement of parts may be had without departing from the spirit and scope of the invention as hereinafter claimed.

I claim:

1. An aircraft indicating instrument comprising: a first means for providing a first signal when said aircraft moves about a first roll axis, a second means for providing a second signal when said aircraft moves about said roll axis, a third means for providing an electrical signal when said aircraft moves about a yaw axis and fourth means for providing an electrical signal when said aircraft moves about a pitch axis; a resolver electrically connected to said second, third and fourth means for providing electrical signals whereby said resolver is capable of combining said second and third signals as a function of said fourth signal; a switch having one side thereof connected to said first means for providing an electrical signal and the other side of said switch being connected to the output of said resolver; and an indicator electrically connected to said switch and responsive to either said first signal or the output of said resolver depending upon the position of said switch.

2. An indicating instrument for aircraft comprising: a gyroscopic device having gimbals and first and second electrical pickoffs on the yaw axis and pitch axis respectively, and a third and fourth electrical pickoff on the roll axis, said pickoffs capable of indicating rotational movement of their respective gimbals about their respective axes and emitting an electrical signal proportional to said rotational movement; a resolver electrically connected and responsive to the outputs of the third, first and second pickoffs such that the output of said resolver is a combination of the outputs of the first pickoff and said third pickoff combined as a function of said second pickoff signal; a switch electrically connected to the output of said resolver and said second pickoff; and an indicator electrically connected to said switch whereby selection of said switch causes either said signal from said fourth pickoff or said signal from said resolver to drive said indicator.

3. The structure of claim 2 wherein said gyroscopic device includes a vertical gyro and a directional gyro.

4. An indicative mechanism for an aircraft, comprising a first gyroscope having freedom of movement about the roll axis of said aircraft; a first electrical pickoff emitting a first electrical signal in response to movement of said first gyroscope about said roll axis; a first gimbal ring supporting said first gyroscope and having freedom of movement about the pitch axis of said aircraft; a second electrical pickoff emitting a second electrical signal in response to movement of said first gimbal ring about said pitch axis; a second gyroscope supported by a second gimbal ring which has freedom of movement about the yaw axis of said aircraft; a third electrical pickoff emitting a third electrical signal in response to movement of said third gimbal ring about said yaw axis; a fourth gimbal ring having freedom of movement about said roll axis and supporting said first and third gimbal rings; a fourth electrical pickoff emitting an electrical signal in response to movement of said fourth gimbal ring about said roll axis with respect to said aircraft; a resolver having a rotor and a stator; said first and third electrical signals being electrically connected to the input of said rotor; a motor connected and responsive to said second electrical signal; said motor being further connected to drive said rotor; a switch electrically connected to the stator of said resolver and to said fourth electrical signal and an indicator electrically connected to said switch whereby said switch causes either said fourth electrical signal or said resolver output to drive said indicator.

5. In an indicator mechanism for presenting the flight attitude of an aircraft, a gimballed gyroscope arrangement mounted in said aircraft and having first, second and third gimbal rings and a first gyroscope, said first gimbal ring having freedom of movement about the roll axis of said aircraft, said second gimbal ring having freedom of movement about the pitch axis of said aircraft, said third gimbal ring having freedom of movement about the yaw axis of said aircraft, and said first gyroscope having freedom of movement about said roll axis of said aircraft, detecting apparatus emitting first, second, third and fourth electrical signals in response to movement with respect to said aircraft of said first, second, and third gimbal rings and said first gyroscope respectively, about their respective axes, combining means electrically connected to receive said second electrical signal, said third electrical signal and said fourth electrical signal for combining said third electrical signal and said fourth electrical signal as a function of said second electrical signal, indicator means electrically connected and responsive to said first electrical signal and said combining means signal; and switching means connected to said indicator means, said combining means, and said first electrical signal for selecting either said combining means signal or said first electrical signal to be transmitted to said indicating means.

References Cited in the file of this patent

UNITED STATES PATENTS

| | | |
|---|---|---|
| 2,597,125 | Noxon | May 20, 1952 |
| 2,698,148 | Gille | Dec. 28, 1954 |